Dec. 24, 1968   C. M. BEAN ET AL   3,417,604
METHODS AND APPARATUS FOR DIFFERENTIAL THERMAL ANALYSIS
Filed Aug. 12, 1965                     5 Sheets-Sheet 1
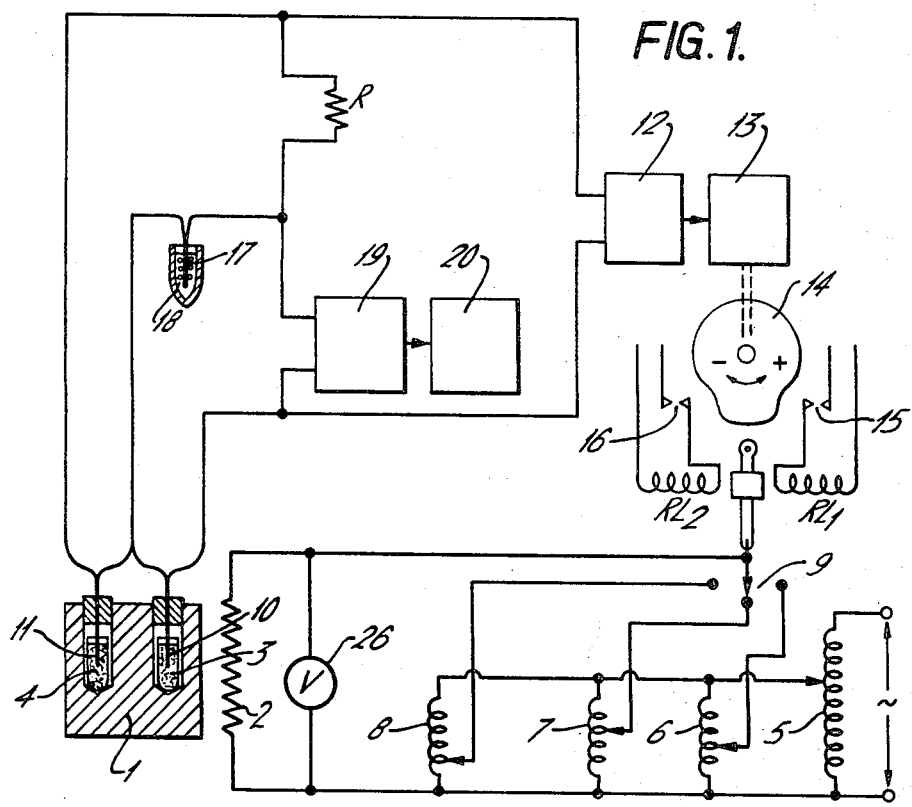
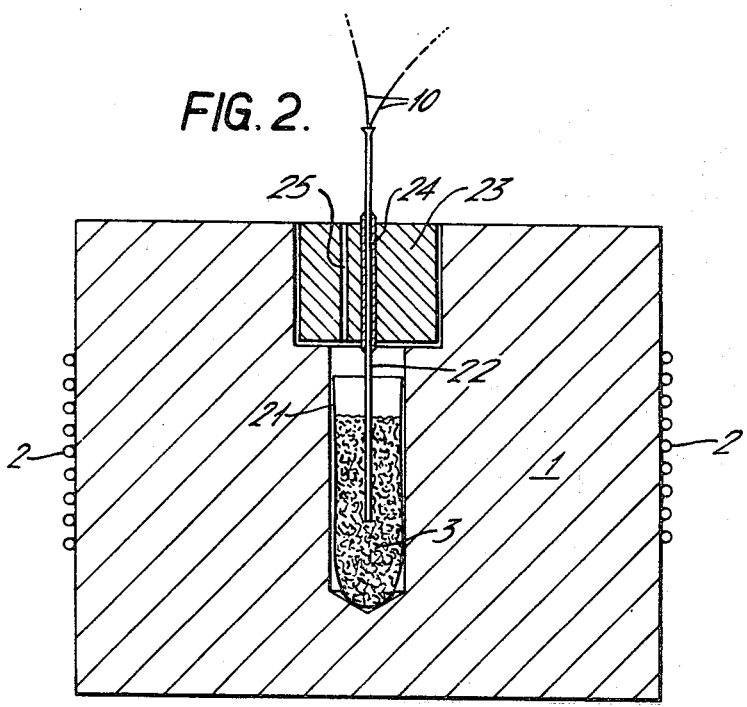

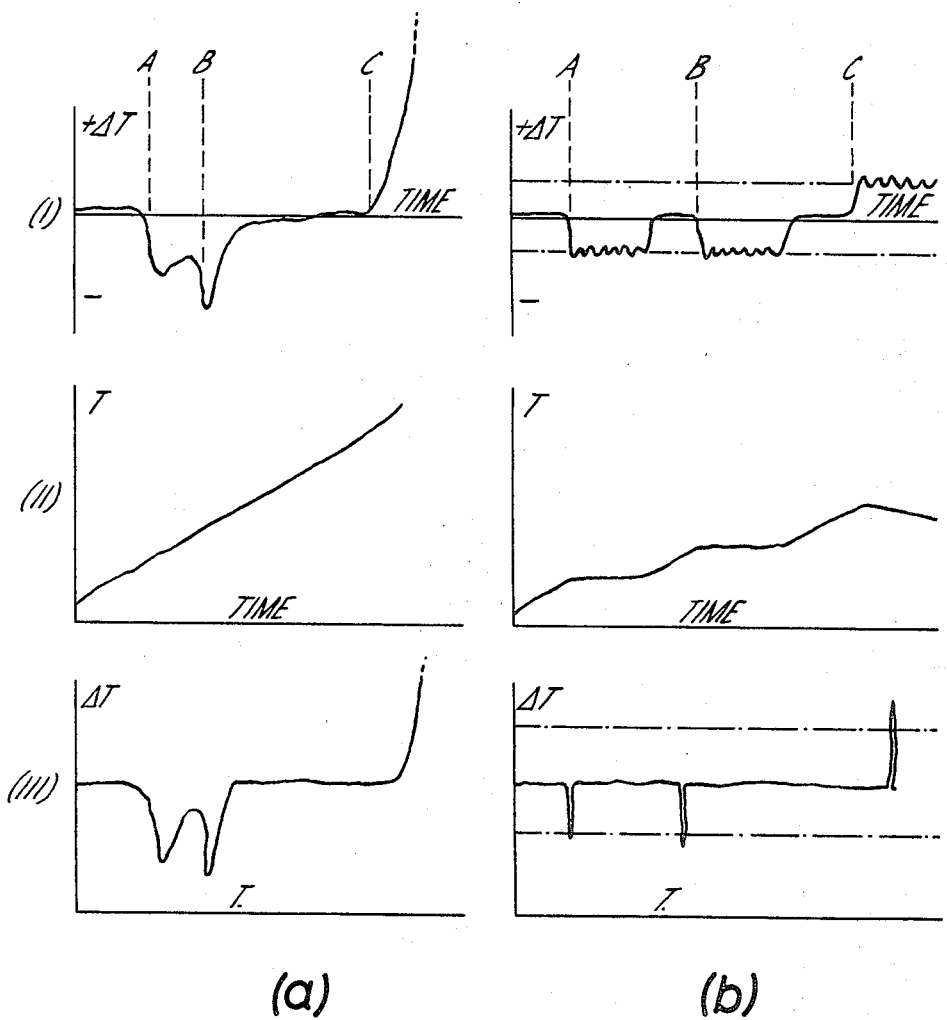

United States Patent Office 3,417,604
Patented Dec. 24, 1968

3,417,604
METHODS AND APPARATUS FOR DIFFERENTIAL THERMAL ANALYSIS
Cecil Morris Bean, Basingstoke, and Robert Hirst Oliver, Sherfield-on-Loddon, Basingstoke, England, assignors to United Kingdom Atomic Energy Authority, London, England
Filed Aug. 12, 1965, Ser. No. 479,224
Claims priority, application Great Britain, Sept. 3, 1964, 36,433/64
6 Claims. (Cl. 73—15)

ABSTRACT OF THE DISCLOSURE

A method and an apparatus for differential thermal analysis wherein a common environmental temperature which changes in a given direction, is applied to a sample substance and to a reference substance. A predetermined value of differential temperature between the sample substance and the reference substance, due to the onset of a reaction in the sample substance, is detected, and the differential temperature is caused to reverse the direction of change of the common environmental temperature until the differential temperature falls below the predetermined value. The common environmental temperature then resumes its change in the given direction until the predetermined value is again attained.

---

Figure 4:
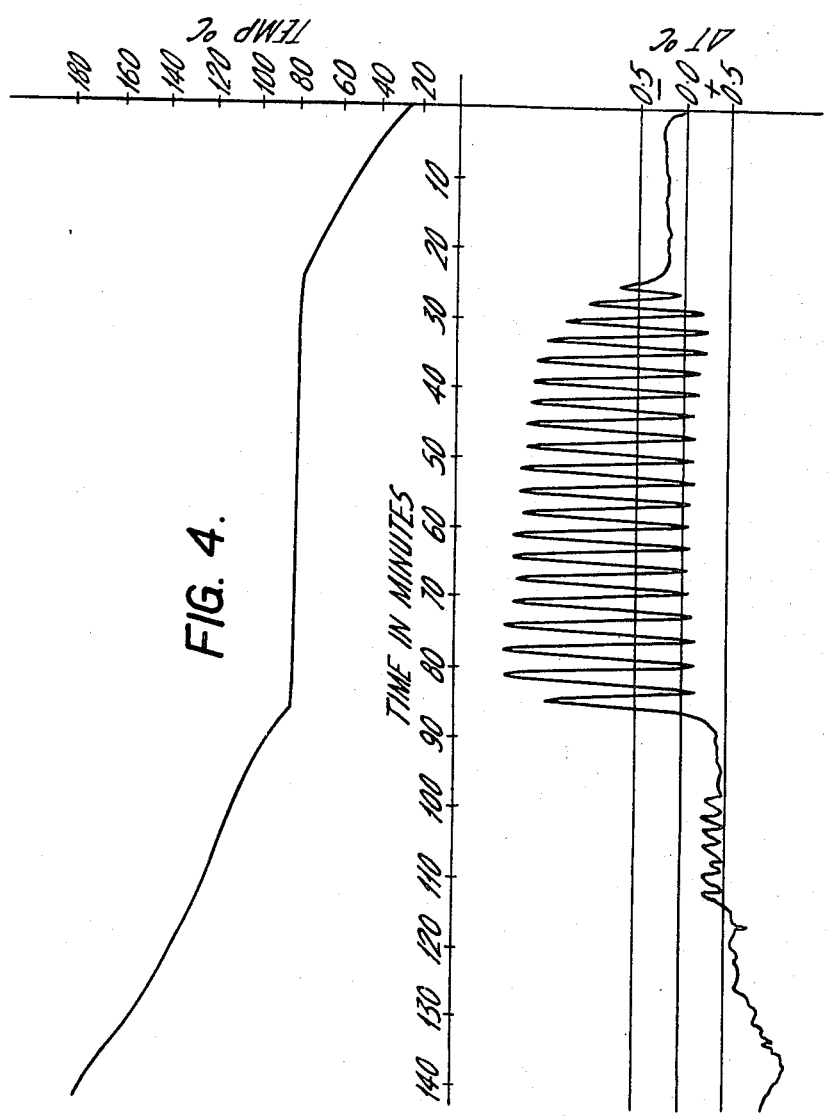

This invention relates to methods and apparatus for differential thermal analysis.

In known differential thermal analysis (DTA) systems, a sample of the substance to be analysed, and a reference substance, are heated by a common environment (e.g. a copper furnace block) whose temperature is made to rise at a known rate, and the temperature differential between sample and reference is plotted as a function of the sample temperature. Endothermic and exothermic changes occurring in the sample are shown by peaks in the differential versus temperature curve.

A disadvantage of the above system is that changes which occur at specific temperatures are shown as peaks which extend over a wide temperature range, since the temperature of the environment continues to rise while the change is occurring. It is therefore difficult to define precisely the true temperature at which the change occurs.

Morever, where a change is exothermic, as with the thermal decomposition of explosives for example, the continued rise in temperature of the environment after the exotherm has commenced leads to an accelerated reaction with the possibility of an explosion.

A further disadvantage is that where different changes occur at a number of successive temperatures, overlapping of the peaks may render interpretation difficult, i.e. the resolution is limited.

The present invention provides a method of differential thermal analysis comprising applying to a sample substance and a reference substance a common environmental temperature which changes in a given direction, detecting a differential temperature between the sample substance and the reference substance due to the onset of a reaction in the sample substance, and applying said differential temperature to modify the changing environmental temperature in a sense to retard the reaction in the sample substance.

The present method also comprises applying to a sample substance and a reference substance a common environmental temperature which changes in a given direction, detecting a predetermined value of differential temperature between the sample substance and the reference substance due to the onset of a reaction in the sample substance, and causing said differential temperature to reverse the direction of change of environmental temperature until the differential temperature falls below said value and thereupon to resume said given direction of environmental temperature change until said value is again attained, so that the environmental temperature assumes a mean value which substantially maintains said predetermined value of differential temperature while the reaction is proceeding.

In one form the present method comprises applying to a sample substance and a reference substance a common increasing environmental temperature, detecting a predetermined value of differential temperature between the sample substance and the reference substance due to the onset of a reaction in the sample substance and causing said differential temperature to reduce the environmental temperature until the differential-temperature falls below said value and thereupon to resume said increase of environmental temperature until said value is again attained, so that the environmental temperature assumes a mean value which substantially maintains said predetermined value of differential temperature while the reaction is proceeding.

The present invention also provides differential thermal analysis apparatus comprising means for changing the common environmental temperature of a sample substance and a reference substance in a given direction, means for detecting a predetermined value of differential temperature between the sample substance and the reference substance, and means operable by said detecting means for reversing the direction of change of environmental temperature until the differential temperature falls below said predetermined value and thereupon resuming the initial direction of change until said value is again attained.

In one form the apparatus comprises means for increasing the common environmental temperature of a sample substance and a reference substance, means for detecting a predetermined value of differential temperature between the sample substance and the reference substance, and means operable by said detecting means for reducing the environmental temperature until the differential temperature falls below said predetermined value and thereupon resuming the increase of environmental temperature until said value is again attained. The environmental temperature reducing means may be adapted to reduce said temperature more quickly when the temperature of the sample substance is greater than the temperature of the reference substance than when the temperature of the sample substance is less than the temperature of the reference substance.

Figure 5:
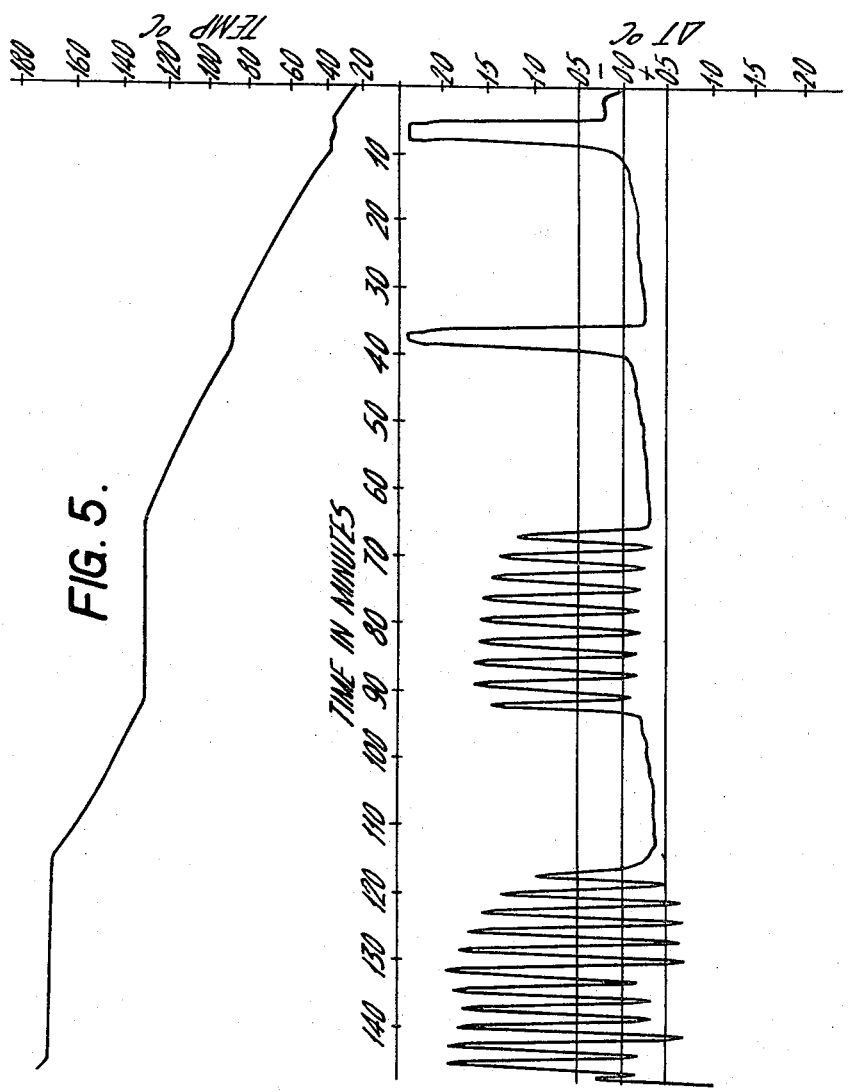
Figure 6:
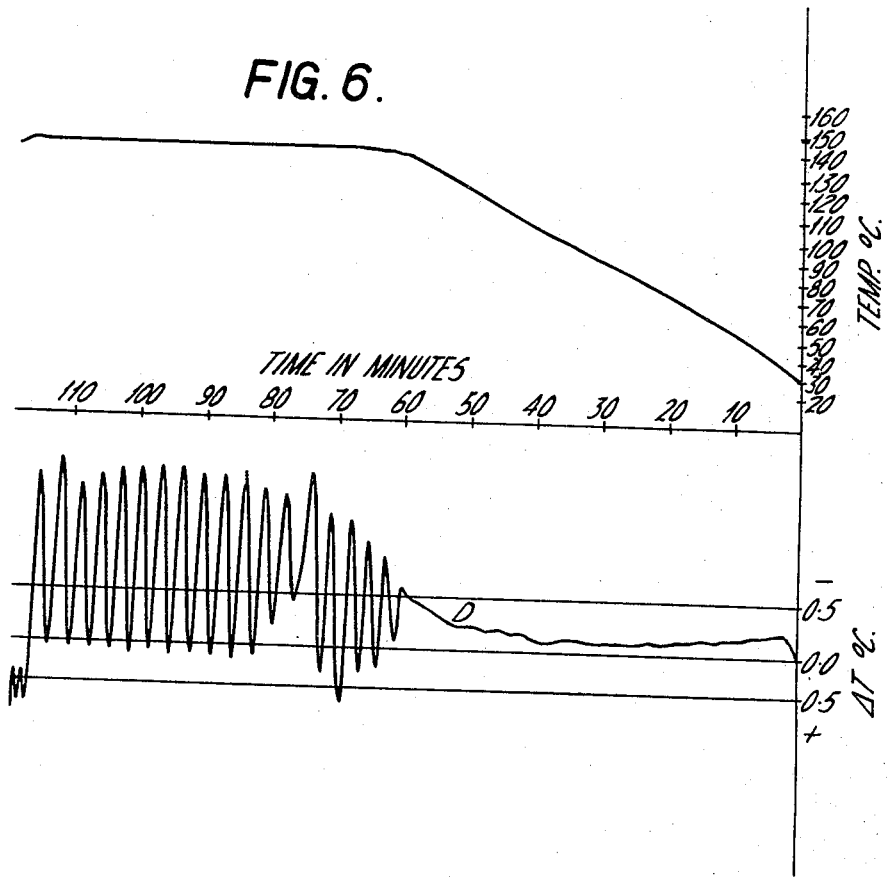

To enable the nature of the present invention to be more readily understood, attention is directed by way of example, to the accompanying drawings wherein:
FIGURE 1 is a schematic circuit diagram of a DTA apparatus embodying the present invention.
FIGURE 2 is a cross-sectional elevation of a thermal matching assembly suitable for use in the embodiment of FIGURE 1.
FIGURES 3(a) and 3(b) show respectively the forms of curves obtainable with known DTA systems and with the present invention.
FIGURES 4, 5 and 6 are graphs of results obtained on three substances with the embodiment of FIGURES 1 and 2.

Referring to FIGURE 1, a copper furnace block 1 heated by an electrical heater winding 2 provides a common environmental temperature for a sample material 3 and a reference material 4 located in holes in the block. The input to the winding 2 is derived from the 50 c./s. mains supply via a variable auto-transformer 5 and one of three further variable auto-transformers 6, 7 and 8 selected by a three-position switch 9. Inserted in the sample and reference materials respectively are identical thermocouples 10 and 11 connected in series-opposition to the input of a DC amplifier 12 (Sunvic DC Amplifier Type DCA 1, Mk. 2) whose output is thus proportional to the difference in temperature between the sample and reference materials. This output is fed to a recorder 13 (Leeds and Northrup Millivolt Recorder Type Speedomax H, Model 5) which is biassed to centre zero. A rotating shaft in the recorder 13 carries a cam 14 which closes microswitches 15 and 16 at readings corresponding to +0.5° C. and −0.5° C. respectively to energise relay RL1 and RL2 which operate switch 9. A voltmeter 26 measures the voltage applied to winding 2.

When the differential temperature does not exceed 0.5° C., winding 2 is fed from transformer 7, which is set to give a desired rate of temperature increase of sample and reference. If (as a result of an exothermic reaction) the sample temperature exceeds the reference temperature by more than 0.5° C., RL1 is energized, and winding 2 is switched to transformer 6 which is set to deliver a smaller voltage than transformer 7 and allows rapid cooling. If (as a result of an endothermic reaction) the sample temperature falls below the reference temperature by 0.5° C., RL2 is energized, and winding 2 is switched to transformer 8, which is set to deliver a voltage between those of transformers 6 and 7 and allows slow cooling. Transformer 5 is used to maintain the desired rate of temperature increase despite increased heat losses as the temperature rises, and is normally operated manually in increments.

The sample thermocouple 10 is also used to measure the absolute temperature of the sample. It is connected in series-opposition with a thermocouple 17 immersed in ice 18 to the input of an amplifier 19 (similar to amplifier 12) whose output is fed to a recorder 20 (similar to recorder 13) but not biased to centre zero). To prevent cross-talk between the relatively high input voltage to amplifier 19 and the much smaller input voltage to amplifier 12, a balancing resistor R approximately equal in value to the input impedance of each amplifier is connected across the reference thermocouple 11.

In operation, the onset of an exothermic reaction giving a temperature differential greater than 0.5° C. causes a reduction in the power supply to the block and allows rapid cooling thereof, which continues until the differential falls to less than 0.5° C. At this point RL1 is de-energized and normal heating from transformer 7 is resumed, the cycle repeating itself. Thus during an exothermic reaction the temperature differential oscillates about 0.5° C., whilst the mean temperature of the block automatically adjusts itself to tend to maintain this differential.

The onset of an endothermic reaction giving a temperature differential greater than 0.5° C. also causes a reduction in the power supply to the block, but to a lesser degree which allows only slow cooling until the differential falls ot less than 0.5° C. At this point RL2 is de-energized and normal heating is resumed. The reason for allowing only slow cooling is that most endothermic reactions consist of either phase changes such as melting or polymorphic changes in crystalline materials. Since these processes are reversible, rapid cooling could result in complete reversal of the process, and the automatic control would set up a permanent oscillatory system. By allowing only slow cooling, only a partial reversion of the endotherm takes place, and the arrangement permits a progressive incremental advance of the endothermic process. Again the temperature differential oscillates about 0.5° C. and the furnace block temperature adjusts itself so that the sample is maintained at the transition temperature. With either type of reaction, no substantial changes in block temperature takes place until the reactions are completed.

Accurate thermal matching between sample and reference is necessary, together with thermocouples of small thermal capacity to give rapid response, and for use with explosive materials, protection of the thermocouples against corrosive decomposition products is desirable. FIGURE 2 shows a form of construction which meets their requirements. The cylindrical copper block 1, encircled by the heater winding 2, is provided with two holes drilled side-by-side to contain sample 3 and reference 4 respectively. For simplicity FIGURE 2 shows only the hole containinng sample 3, held in a tubular glass vessel 21, but the arrangement for reference 4 is identical. A 40 SWG copper-constantan thermocouple 10 is brazed at the junction inside a stainless-steel hypodermic needle sheath 22 of 0.014 inch ID and 0.028 inch OD. This rigid assembly is inserted in the sample through a close-fitting copper plug 23, which acts as a heat seal by preventing heat losses from the block via the sample and thermocouples to the atmosphere. A thin electrically insulating sleeve 24 of polytetrafluoroethylene, through which the sheath 22 is pushed, enables accurate location of the thermocouple tip within the sample to be achieved. A vent 25 is provided for the release of gaseous decomposition products.

Provided the same bulk of sample and reference material is used, the above-described arrangement has given good matching with a wide range of powders against a precipitated barium sulphate reference. When a powdered sample melts however, and the volume of liquid is less than the original bulk volume of the powder, an unavoidable mismatch results. For liquid samples an equal volume of silicone oil has been used as the reference material.

FIGURE 3(a) shows (i) the form of the curves of differential temperature ($\Delta T$) against time, (ii) the absolute sample temperature (T) against time, and (iii) $\Delta T$ against T, obtained with known DTA apparatus. A positive value of $\Delta T$ indicates that the sample temperature exceeds the reference temperature, i.e. an exothermic reaction, a negative value of $\Delta T$ the opposite condition i.e. an endothermic reaction. Two endothermic reactions A and B, and one exothermic reaction C, are indicated.

FIGURE 3(b) shows corresponding curves for the present apparatus. It will be seen that the two endothermic reactions are now well separated in time, and that the absolute temperatures at which the reactions occur are well defined. In FIGURE 3(b)(iii), obtained by feeding the output of amplifiers 12 and 19 to an X–Y recorder, the occurrence of the reactions is clearly shown by the sharp peaks.

FIGURE 4 shows the melting of a sample of TNT at 79–82° C. The gradual increase in temperature over the melting range is due to the presence of small amounts of impurity. Following complete melting of the sample, a mismatch condition results in the record showing an apparent exotherm. At 113 minutes, the automatic control was switched out, allowing normal heating to continue permanently, and the irregular pattern of the differential thereafter, together with the absence of a significant increase in differential, implies that the positive excursion of the differential is not due to exothermic reaction, but is due to the mismatch produced by a change of state in the sample.

FIGURE 5 shows the polymorphic changes and melting of ammonium nitrate at a heating rate of 2° C. per minute. The beta-gamma change at 39.5–37° C. is not fully under control because at this point the heater block temperature is only about 20° C. above ambient and although the heater supply is reduced by the endothermic excursion of the differential temperature, only very slow cooling by heat loss to atmosphere can take place.

The second phase-change (gamma-delta) at 84° C. is again only partly controlled. The slightly larger difference in temperature between the heater block and ambient does allow appreciable cooling and the amplitude of the differential excursion is limited by the control system.

At higher temperatures however, where sufficient cooling can take place, the apparatus exerts full control, and records the delta-epsilon change at 125° C. and melting at 169.5° C. Here again, the solid-liquid phase change produced mismatch and further heating was not continued.

This sample illustrates the clean separation and accurate temperature determination of four successive thermal changes.

FIGURE 6 shows the melting of PETN at 140° C. Although the sample was nominally pure it is probable that a very small amount of liquid phase is present at point D on the differential record, when the sample temperature is 123° C. The ability to detect first liquid is a useful feature when using the equipment for phase diagram studies. The complete liquefaction of the powdered PETN again produced a permanent mismatch.

The problem of insufficient cooling of the heater block when operating near the ambient temperature, mentioned with reference to FIGURE 5, can be overcome by modifying the apparatus to employ forced cooling, e.g. by causing water to flow through cooling channels formed in the heater block.

The present invention provides the following advantages over known DTA systems.

(a) Exothermic reactions are not permitted to reach "run away" conditions, but are constrained to continue only at a rate which produces a predetermined means differential temperature (0.5° C. in the described embodiment).

(b) Limiting the reaction rate enables further information on the nature of an exothermic reaction to be obtained by observing the change in sample temperature during the reaction. For example a gradual fall in sample temperature as the exothermic reaction proceeds (as shown at C in FIGURE 3(b)(ii)) indicates an auto-catalytic reaction, where decomposition products are attempting to accelerate the original thermal decomposition, but the control system, by reducing the temperature, does not allow the reaction to build up beyond the state where a 0.5° C. mean differential is obtained. A slow increase in sample temperature indicates a normal reaction in which the temperature is the main rate-determining factor.

(c) With endothermic reactions in particular, the system isolates each reaction in turn, allowing one reaction to be completed before the sample temperature is raised further. This is particularly advantageous where a number of reactions occur over a small temperature range, as it results in good discrimination; a composite peak obtained by known methods can often be separated into two distinct components.

Although in the described embodiment the sample and reference are subjected to an increasing environmental temperature, the present invention can also be used to perform differential thermal analysis on a sample and reference subjected to a falling environmental temperature, the reactions of interest being exothermic phase changes. In this case, a predetermined value of differential temperature is arranged to reverse the cooling of sample and reference e.g. by applying further heating.

We claim:

1. A method of differential thermal analysis comprising applying to a sample substance and a reference substance a common environmental temperature which changes in a given direction, detecting a differential temperature between the sample substance and the reference substance due to the onset of a reaction in the sample substance, and applying said differential temperature to reverse the direction of change of the common environmental temperature when said differential temperature increases, and to resume said given direction of common environmental temperature when said differential temperature decreases, so that the common environmental temperature assumes a mean value while the reaction is proceeding.

2. A method of differential thermal analysis comprising applying to a sample substance and a reference substance a common environmental temperature which changes in a given direction, detecting a predetermined value of differential temperature between the sample substance and the reference substance due to the onset of a reaction in the sample substance, and causing said differential temperature to reverse the direction of change of common environmental temperature until the differential temperature falls below said value and thereupon to resume said given direction of common environmental temperature change until said value is again attained, so that the common environental temperature assumes a mean value which substantially maintains said predetermined value of differential temperature while the reaction is proceeding.

3. A method of differential thermal analysis comprising applying to a sample substance and a reference substance a common increasing environmental temperature, detecting a predetermined value of differential temperature between the sample substance and the reference substance due to the onset of a reaction in the sample substance, and causing said differential temperature to reduce the common environmental temperature until the differential temperature falls below said value and thereupon to resume said increase of common environmental temperature until said value is again attained, so that the common environmental temperature assumes a mean value which substantially maintains said predetermined value of differential temperature while the reaction is proceeding.

4. Differential thermal analysis apparatus comprising means for changing the common environmental temperature of a sample substance and a reference substance in a given direction, means for detecting a predetermined value of differential temperature between the sample substance and the reference substance, and means operable by said detecting means for reversing the direction of change of common environmental temperature until the differential temperature falls below said predetermined value and thereupon resuming the initial direction of change until said value is again attained.

5. Differential thermal analysis apparatus comprising means for increasing the common environmental temperature of a sample substance and a reference substance, means for detecting a predetermined value of differential temperature between the sample substance and the reference substance, and means operable by said detecting means for reducing the common environmental temperature until the differential temperature falls below said predetermined value and thereupon resuming the increase of common environmental temperature until said value is again attained.

6. Apparatus as claimed in claim 5 wherein the common environmental temperature reducing means is adapted to reduce said temperature more quickly when the temperature of the sample substance is greater than the temperature of the reference substance than when the temperature of the sample substance is less than the temperature of the reference substance.

References Cited

UNITED STATES PATENTS 3,319,456   5/1967   Speros _____ 73—15

JAMES J. GILL, *Primary Examiner.*

EDDIE E. SCOTT, *Assistant Examiner.*